(12) United States Patent
Hajek

(10) Patent No.: US 8,757,688 B1
(45) Date of Patent: Jun. 24, 2014

(54) AUXILIARY HANDLE FOR A TOOL

(71) Applicant: Riordan Hajek, Minneapolis, MN (US)

(72) Inventor: Riordan Hajek, Minneapolis, MN (US)

(*) Notice: Subject to any disclaimer, the term of this patent is extended or adjusted under 35 U.S.C. 154(b) by 0 days.

(21) Appl. No.: 13/707,432

(22) Filed: Dec. 6, 2012

(51) Int. Cl.
*B25G 1/04* (2006.01)
*A01B 1/22* (2006.01)

(52) U.S. Cl.
USPC .............................................. 294/58; 294/57

(58) Field of Classification Search
USPC ............. 294/49, 54.5, 51, 53.5, 57, 58, 50.9; 37/265, 284, 285; D8/10; 403/99, 108, 403/113, 164, 167, 373; 16/426, 429; 254/131.5
See application file for complete search history.

(56) References Cited

U.S. PATENT DOCUMENTS

| | | | | | |
|---|---|---|---|---|---|
| 4,050,728 | A | * | 9/1977 | Davidson | 294/58 |
| 4,615,553 | A | * | 10/1986 | Hultine | 294/58 |
| 4,624,374 | A | * | 11/1986 | Murtaugh | 211/60.1 |
| 4,722,512 | A | * | 2/1988 | Lighthizer | 294/59 |
| 5,074,506 | A | * | 12/1991 | Larsen | 248/309.1 |
| 5,496,085 | A | * | 3/1996 | Middleton | 294/58 |
| 5,921,600 | A | * | 7/1999 | Lucas | 294/58 |
| 2005/0206178 | A1 | * | 9/2005 | Hoeft | 294/58 |

* cited by examiner

*Primary Examiner* — Paul T Chin
(74) *Attorney, Agent, or Firm* — Kinney & Lange, P.A.

(57) ABSTRACT

An auxiliary handle includes an auxiliary shaft, a joint bracket, and a joint clamp. The auxiliary shaft extends along an auxiliary axis and has two ends. The joint bracket has a bracket axis which is substantially perpendicular to the auxiliary axis, and one end of the auxiliary shaft is rotatably connected to the joint bracket for rotation about the bracket axis. The joint clamp has a joint axis which is substantially perpendicular to the bracket axis, and the joint bracket is rotatably connected to the joint clamp for rotation about the joint axis.

25 Claims, 4 Drawing Sheets

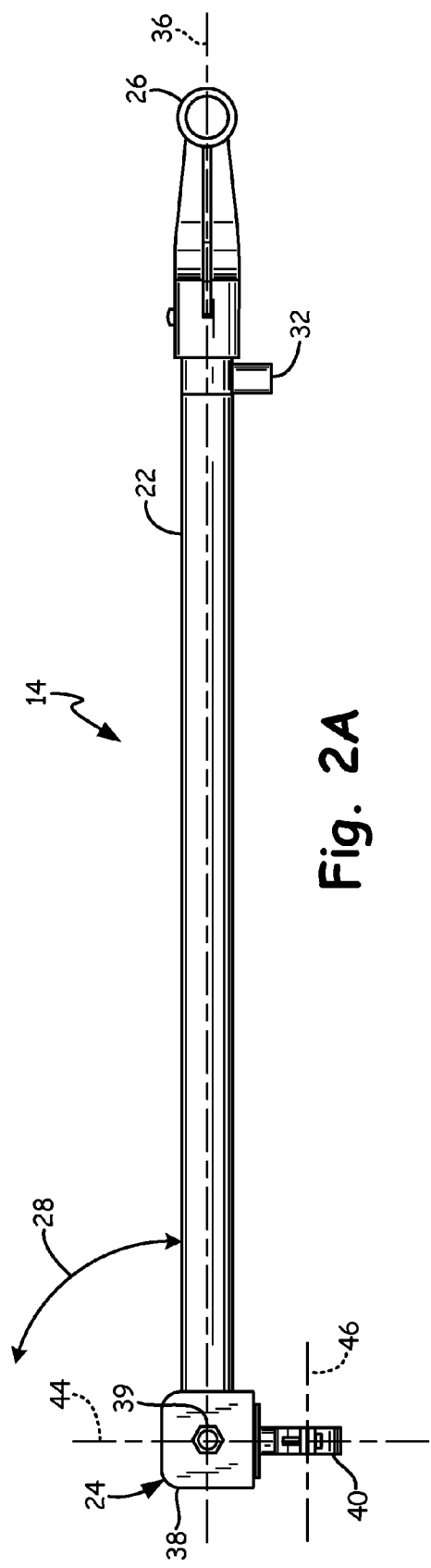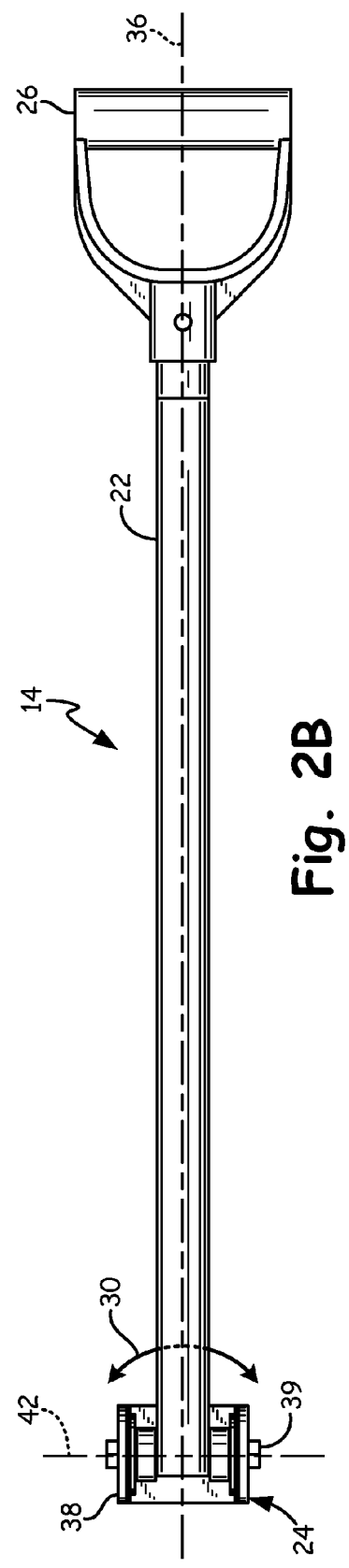

US 8,757,688 B1

AUXILIARY HANDLE FOR A TOOL

BACKGROUND

The present invention is related to hand-operated tools, and, in particular, to a dual-handle tool.

Despite the advanced state of machinery and robotics, people oftentimes find themselves physically wielding tools. While this may be a cheaper, simpler, and/or faster method of performing work, it can take a toll on the human body. For example, tools such as the shovel and the weed trimmer have simple user interfaces with respect to their gross manipulation. Generally, the user grips a shaft of the tool (or one or more handles rigidly attached to the shaft) at two separate places approximately shoulder-width apart. Thereby, the user can exert force against the tool to precisely position the tool and/or use the tool as a lever. But using a tool configured as such often requires the user to bend or rotate their body. Because these tools can carry great weight or be heavy in and of themselves, awkward movement of the body while using such a tool can put substantial strain on a person's back. If the strain is too large or is repeated too many times, the strain can cause permanent injury, leaving the person unable to use the tool anymore.

SUMMARY

According to one embodiment of the present invention, an auxiliary handle includes an auxiliary shaft, a joint bracket, and a joint clamp. The auxiliary shaft extends along an auxiliary axis and has two ends. The joint bracket has a bracket axis which is substantially perpendicular to the auxiliary axis, and one end of the auxiliary shaft is rotatably connected to the joint bracket for rotation about the bracket axis. The joint clamp has a joint axis which is substantially perpendicular to the bracket axis, and the joint bracket is rotatably connected to the joint clamp for rotation about the joint axis.

In another embodiment, a shovel assembly includes a shovel and an auxiliary handle. The shovel includes a shovel grip, a shovel shaft connected to the shovel grip, and a shovel blade connected to the shovel shaft. The auxiliary handle includes an auxiliary shaft extending along an auxiliary axis, an auxiliary grip connected to the auxiliary shaft, and a joint bracket that is rotatably connected to the auxiliary shaft such that the joint bracket can rotate about the bracket axis which is substantially perpendicular to the auxiliary axis. In addition, the auxiliary handle includes a joint clamp that is rotatably connected to the joint bracket such that the joint clamp can rotate about the joint axis which is substantially perpendicular to the bracket axis, wherein the auxiliary handle is connected to the shovel at the joint clamp.

In another embodiment, a universal joint for connecting an auxiliary handle to a tool includes a joint bracket and a joint clamp. The joint bracket connects the auxiliary handle to the universal joint for rotation about a bracket axis. The joint bracket includes a first bracket with a joint bore having a joint axis and a first bracket bore coaxial with a bracket axis, wherein the joint axis and the bracket axis are substantially perpendicular. The second bracket is in contact with the first bracket, and the second bracket includes a second bracket bore that is substantially coaxial with the bracket axis. The first bushing is for contacting the auxiliary handle and has a third bracket bore that is coaxial with the bracket axis. The joint clamp is rotatably connected to the joint bracket to allow rotation about the joint axis, the joint clamp being mechanically connectable to and disconnectable from a tool shaft. [THIS SECTION WILL BE COMPLETED ACCORDING TO THE K&L PATENT DRAFTING GUIDELINES AFTER FINALIZATION OF THE INDEPENDENT CLAIMS]

BRIEF DESCRIPTION OF THE DRAWINGS

FIG. 2A shows a side view of the auxiliary handle including a universal joint.

FIG. 2B shows a top view of the auxiliary handle including the universal joint.

DETAILED DESCRIPTION

Figure 1:
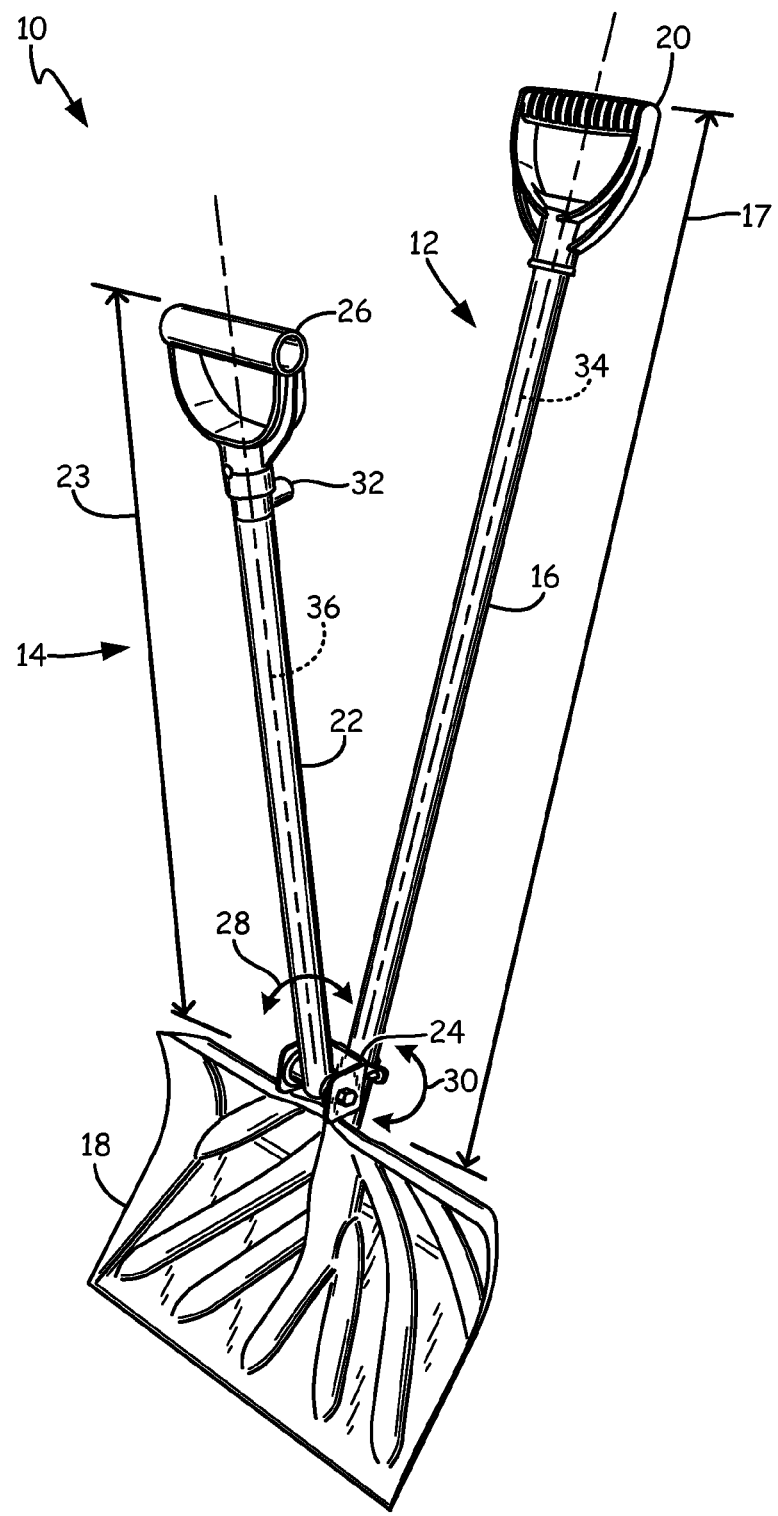
FIG. 1 shows a perspective view of a shovel assembly including a shovel and an auxiliary handle.

In FIG. 1, a perspective view of shovel assembly 10 is shown, including shovel 12 and auxiliary handle 14. Shovel 12 includes shovel shaft 16 that extends along tool shaft axis 34, with shovel blade 18 at one end and shovel grip 20 at the opposite end. In the illustrated embodiment, shovel grip 20 is a spade grip, meaning that the grasped portion of shovel grip 20 is perpendicular to tool shaft axis 34.

Auxiliary handle 14 includes auxiliary shaft 22 that extends along auxiliary axis 36, with universal joint 24 at one end and auxiliary grip 26 at the opposite end. Auxiliary grip 26 is also a spade grip, wherein the grasped portion of auxiliary grip 26 is perpendicular to auxiliary axis 36. To maximize the utility of auxiliary handle 14, auxiliary shaft length 23 is preferably between 50% and 100% as long as shovel shaft length 17. In one embodiment (illustrated in FIG. 1), auxiliary shaft length 23 is approximately 85% as long as shovel shaft length 17.

In the illustrated embodiment, auxiliary handle 14 is attached to shovel 12 at universal joint 24, proximate to shovel blade 18. Universal joint 24 allows for two degrees of freedom of movement between auxiliary handle 14 and shovel 12. More specifically, universal joint 24 allows for auxiliary handle 14 to rotate forward away from shovel shaft 16 along front direction 28. Universal joint 24 also allows for auxiliary handle 14 to rotate around to either side of shovel shaft 16 along side direction 30. As will be described further with respect to FIG. 3, universal joint 24 is mechanically attachable and detachable to shovel shaft 16 (shown in FIG. 1) without permanent modification of either universal joint 24 or shovel shaft 16.

Universal joint 24 also allows auxiliary shaft 22 to be positioned alongside and parallel to shovel shaft 16. In this position, retainer 32, which is attached to auxiliary shaft 22 near auxiliary grip 26, can interface with shovel shaft 16. Retainer 32 holds auxiliary shaft 22 in place, preventing relative movement between auxiliary handle 14 and shovel 12. In the illustrated embodiment, retainer 32 is a magnet, although retainer 32 can be any of a number of quickly-detachable fastening devices.

Figure 4:
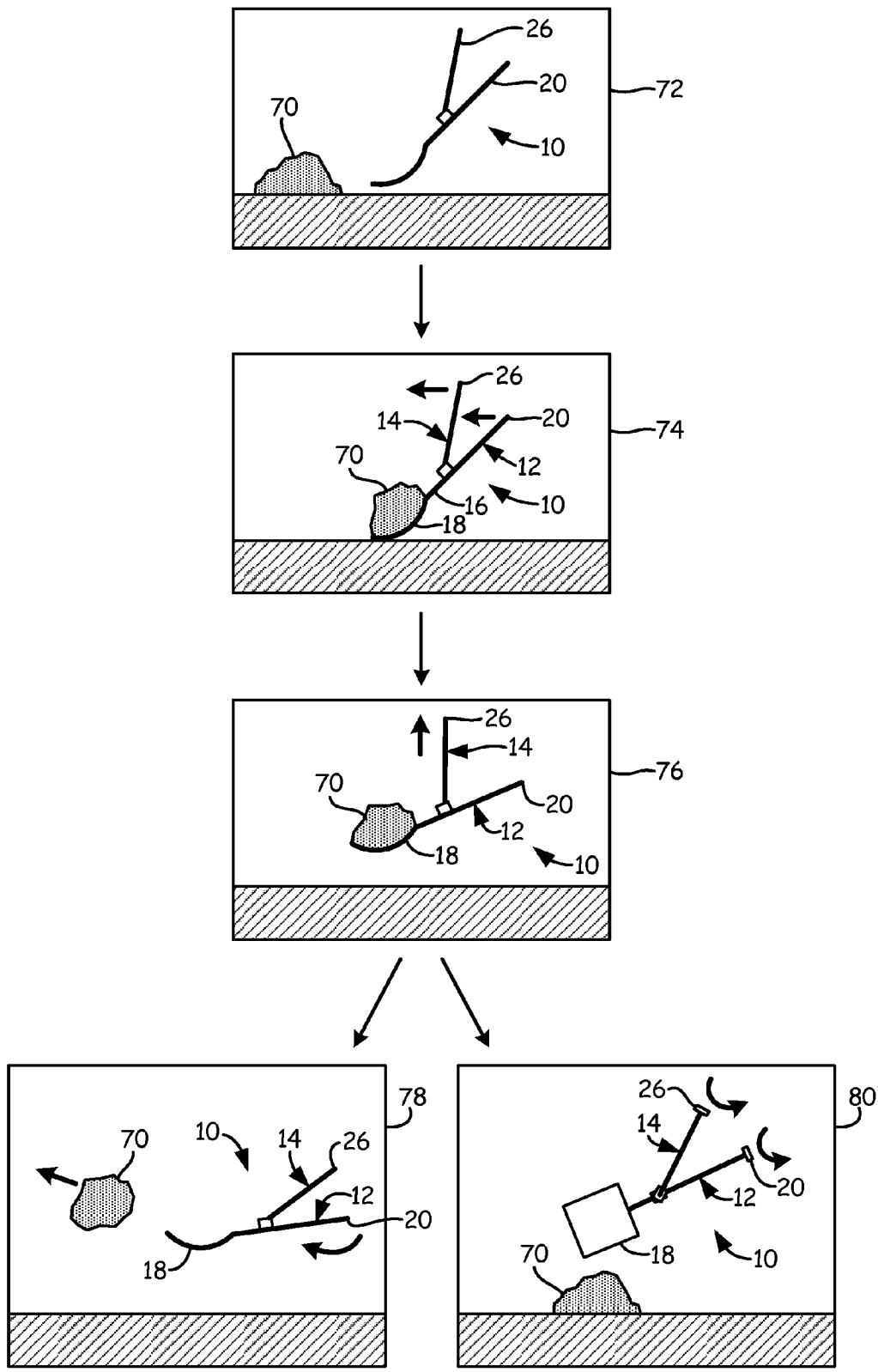
FIG. 4 shows a method of using the shovel assembly.

The components and configuration of shovel assembly 10 as shown in FIG. 1 allow for shovel 12 to be used without requiring a user to bend over in order to grasp the distal or blade-end of shovel shaft 16 (as discussed further with FIG. 4). In addition, auxiliary handle 14 is selectively connectable to and selectively disconnectable from shovel 12. Furthermore, retainer 32 allows for auxiliary handle 14 to be stowed to allow for typical use of shovel 12 and storage of shovel assembly 10.

Depicted in FIG. 1 is one embodiment of the present invention, to which there are alternative embodiments. For example, shovel 12 can be a different type of tool with a long shaft, such as a weed trimmer or a hoe. In another example, retainer 32 can be attached to shovel shaft 16 and be configured to interface with auxiliary shaft 22.

In FIG. 2A, a side view of auxiliary handle 14 is shown (disconnected from shovel 12 and by itself), including universal joint 24. In FIG. 2B, a top view of auxiliary handle 14 is shown. FIGS. 2A-2B will now be discussed simultaneously.

As stated previously, universal joint 24 is attached to auxiliary handle 14 at one end of auxiliary shaft 22. Universal joint 24 includes joint bracket 38 and joint clamp 40. In the illustrated embodiment, joint bracket 38 is rotatably attached to auxiliary shaft 22 by bracket bolt 39 such that universal joint 24 rotates about bracket axis 42. Because bracket axis 42 is substantially perpendicular to auxiliary axis 36, auxiliary handle 14 can rotate along front direction 28.

Figure 3:
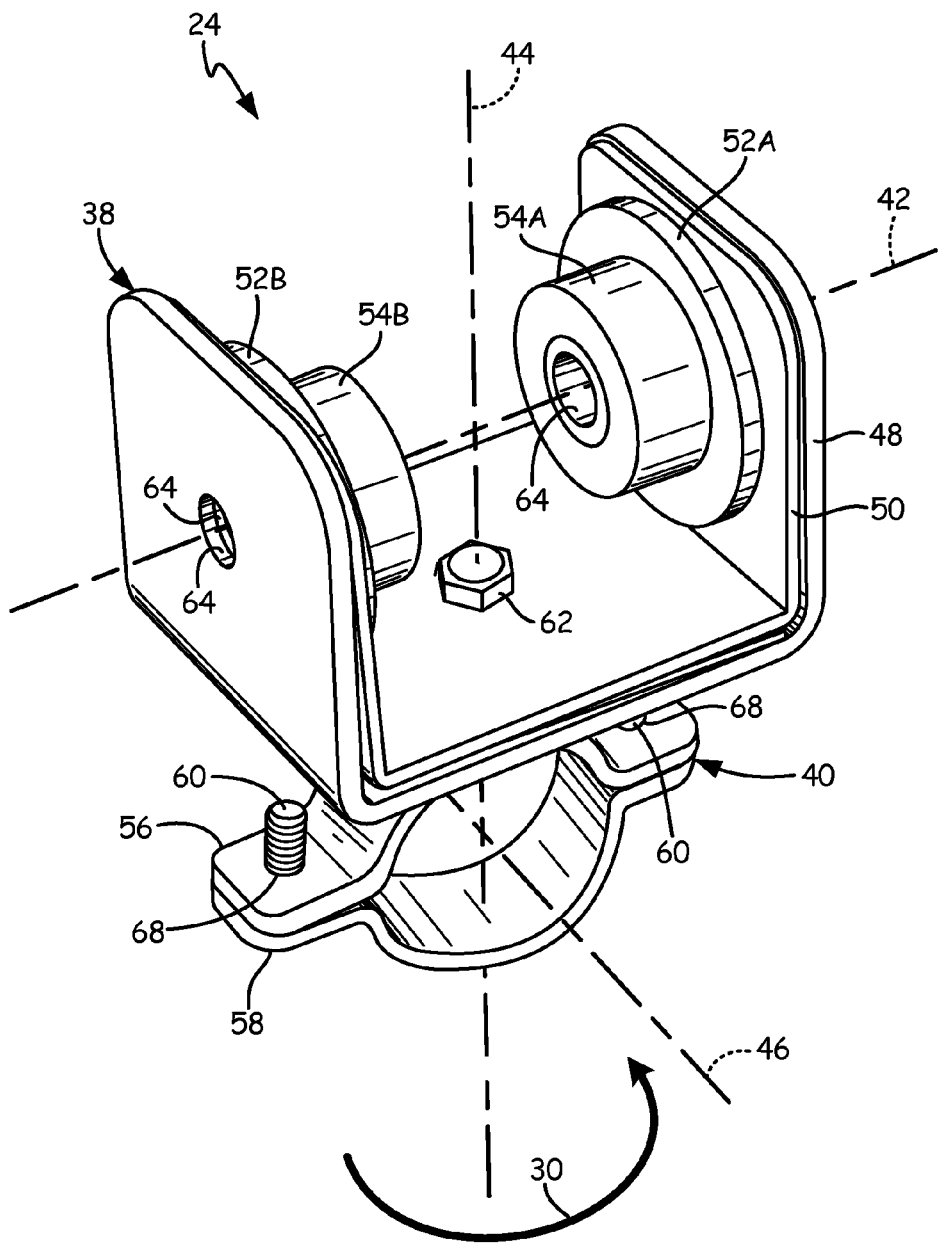
FIG. 3 shows a perspective view of the universal joint including a joint bracket and a joint clamp.

In the illustrated embodiment, joint clamp 40 is rotatably attached to joint bracket 38 such that auxiliary shaft 22 and joint bracket 38 can rotate about joint axis 44. Because joint axis 44 is substantially perpendicular to bracket axis 42, auxiliary handle 14 can rotate along side direction 30. Joint clamp 40 includes a cylindrical aperture (as shown in FIG. 3) that extends along clamp axis 46 through which shovel shaft 16 passes. Thereby, when joint clamp 40 is mounted to shovel shaft 16, clamp axis 46 is substantially collinear with tool shaft axis 34 (shown in FIG. 1).

The components and configuration of auxiliary handle 14 as shown in FIGS. 2A-2B allow for auxiliary handle 14 to be attached to shovel 12 (shown in FIG. 1) while still permitting rotation about two axes.

In FIG. 3, a perspective view of universal joint 24 is shown, including joint bracket 38 and joint clamp 40. In the illustrated embodiment, universal joint 24 has been mechanically detached from shovel 12 (shown in FIG. 1). Joint bracket 38 includes first bracket 48, second bracket 50, washers 52A-52B, and bushings 54A-54B. In the illustrated embodiment, second bracket 50 is made of polymer and is nested inside of first bracket 48, which is made of metal. Adjacent to the inside of second bracket 50 are two metallic washers 52A-52B. Inside of each washer 52A-52B is a polymer bushing 54A-54B, respectfully.

First bracket 48 includes two bracket bores 64 on each side of first bracket 48 (although not all of bracket bores 64 are visible in FIG. 3). Similarly, second bracket 50 includes two bracket bores 64 on each side of second bracket 50. In addition, each washer 52A-52B and each bushing 54A-54B includes a bracket bore 64. All of bracket bores 64 extend through first bracket 48, second bracket 50, washers 52A-52B, and bushings 54A-54B, respectively, and are coaxial with bracket axis 42. This allows for bracket bolt 39 (shown in FIG. 2) to pass through universal joint 24.

Both first bracket 48 and second bracket 50 also include joint bores (although the joint bores are hidden by clamp bolt 62. The joint bores extend through first bracket 48 and second bracket 50, respectively, and are coaxial with joint axis 44.

In the illustrated embodiment, joint clamp 40 includes first clamp portion 56, second clamp portion 58, two clamp fasteners 60, and clamp bolt 62. Clamp bolt 62 extends from the top of first clamp portion 56 and into the joint bores in first bracket 48 and second bracket 50. Clamp bolt 62 rotatably attaches joint clamp 40 to joint bracket 38, allowing relative motion in side direction 30. First clamp portion 56 includes two securing bores 68, one on each side of first clamp portion 56. Similarly, second clamp portion 58 includes two securing bores 68, one on each side of second clamp portion 58 (although not all of securing bores 68 are visible in FIG. 3). On each side of second clamp portion 58, securing bores 68 are aligned with securing bores 68 on each side of first clamp portion 56, respectively. Thereby, a clamp fastener 60 can be positioned in each set of securing bores 68 to attach first clamp portion 56 to second clamp portion 58.

The components and configuration of universal joint 24 as shown in FIG. 3 allow for a close connection between the end of auxiliary handle 22 (shown in FIG. 2) and shovel shaft 16 (shown in FIG. 1). This is due to the proximity of bracket axis 42 to joint clamp 40. Also, auxiliary shaft 22 (shown in FIG. 2) can be rotatably attached to joint bracket 38, while still having side-to-side motion prevented by bushings 54A-54B. In one embodiment, bushings 54A-54B are polymer to prevent binding between bushings 54A-54B and auxiliary shaft 22. In addition, universal joint 24 can rotate along side direction 30 because joint clamp 40 is rotatably attached to joint bracket 38. Furthermore, universal joint can be mounted on shovel 12 (shown in FIG. 1) because joint clamp 40 has first clamp portion 56 and second clamp portion 58 that substantially surround and clamp onto shovel shaft 16 (shown in FIG. 2) when assembled.

In FIG. 4, a method of using shovel assembly 10 is shown. In general, shovel assembly 10 is being used to shovel snow 70 beginning at step 72. Throughout the method, the user maintains one hand on shovel grip 20 and the other hand on auxiliary handle 26. At step 74, shovel assembly 10 is moved forward by the user advancing both shovel grip 20 of shovel 12 and auxiliary grip 26 of auxiliary handle 14, picking up snow 70 with shovel blade 18. At step 76, shovel blade 18 is raised by the user holding shovel grip 20 in place and lifting auxiliary grip 26. At step 78, snow 70 is thrown forward by the user holding auxiliary grip 26 in place and moving shovel grip 20 forward rapidly, propelling snow 70 off of shovel blade 18. Alternatively, from the position shown at step 76, the user can dump snow 70 at step 80 by twisting both shovel grip 20 and auxiliary grip 26 to the side. This orients shovel blade 18 vertically, allowing snow 70 to fall.

The method of operation of shovel assembly 10 as shown in FIG. 4 allows for shovel blade 18 to be moved by manipulating shovel grip 20 and/or auxiliary grip 26. In addition, the position of auxiliary grip 26 is generally closer to shovel grip 20 than the distal end of shovel shaft 16 is. This allows the grasping portions of shovel assembly 10 to be closer to the core of the body of the user, reducing the strain on the user when manipulating shovel assembly 10.

Depicted in FIG. 4 is one embodiment of the present invention, to which there are alternative embodiments. For example, shovel assembly 10 can be used as a standard shovel would be used if retainer 32 (shown in FIG. 1) is used to hold auxiliary handle 14 against shovel 12.

It can be recognized that the present invention offers numerous benefits and advantages. For example, a user of the shovel assembly does not need to bend down in order to pick up the blade of the shovel. For another example, the short distance between the bracket axis and the joint clamp reduces the length of the moment arm between the joint clamp and the auxiliary handle. This minimizes the stress on the universal joint when the auxiliary handle is used to move the shovel assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An auxiliary handle comprising:
   an auxiliary shaft that extends along an auxiliary axis and has a first end and a second end;
   a joint bracket having a bracket axis which is substantially perpendicular to the auxiliary axis, wherein the second end of the auxiliary shaft is rotatably connected to the joint bracket for rotation about the bracket axis, and wherein the joint bracket further includes:
      a first bracket including a joint bore that is coaxial with the joint axis and a first bracket bore that is coaxial with the bracket axis;
      a second bracket in contact with the first bracket, the second bracket including a second bracket bore that is coaxial with the bracket axis; and
      a first bushing for contacting the auxiliary handle, the first bushing having a third bracket bore that is coaxial with the bracket axis; and
   a joint clamp having a joint axis which is substantially perpendicular to the bracket axis, wherein the joint bracket is rotatably connected to the joint clamp for rotation about the joint axis.

2. The auxiliary handle of claim 1, wherein the joint clamp is mountable to a tool shaft that extends along a tool shaft axis, the joint clamp having a clamp axis that is substantially parallel to the tool shaft axis when the auxiliary handle is mounted to the tool shaft.

3. The auxiliary handle of claim 1, wherein the joint clamp comprises:
   a first clamp portion including a first securing bore and a clamp bolt that extends along the joint axis;
   a second clamp portion including a second securing bore that is aligned with the first securing bore; and
   a clamp fastener extending through both the first securing bore and the second securing bore;
   wherein the joint bracket is rotatably attached to the joint clamp by the clamp bolt that passes through a joint bore in the joint bracket.

4. The auxiliary handle of claim 1, and further comprising: a magnet attached to the first end of the auxiliary shaft.

5. The auxiliary handle of claim 1, and further comprising: an auxiliary grip connected to the first end of the auxiliary shaft.

6. The auxiliary handle of claim 5, wherein the auxiliary grip is a spade grip including a grip portion that extends substantially perpendicularly to the auxiliary axis.

7. A shovel assembly comprising:
   a shovel comprising a shovel grip, a shovel shaft connected to the shovel grip, and a shovel blade connected to the shovel shaft; and
   an auxiliary handle comprising:
      an auxiliary shaft that extends along an auxiliary axis;
      an auxiliary grip connected to the auxiliary shaft;
      a joint bracket that is rotatably connected to the auxiliary shaft such that the joint bracket can rotate about the bracket axis which is substantially perpendicular to the auxiliary axis; and
      a joint clamp that is rotatably connected to the joint bracket such that the joint clamp can rotate about the joint axis which is substantially perpendicular to the bracket axis, wherein the auxiliary handle is connected to the shovel at the joint clamp, and wherein the joint clamp comprises:
         a first clamp portion including a first securing bore and a clamp bolt that extends along the joint axis;
         a second clamp portion including a second securing bore that is aligned with the first securing bore; and
         a clamp fastener extending through both the first securing bore and the second securing bore;
         wherein the joint bracket is rotatably attached to the joint clamp by the clamp bolt that passes through a joint bore in the joint bracket.

8. The shovel assembly of claim 7, wherein the auxiliary handle is connected to the shovel shaft proximate to the shovel blade.

9. The shovel assembly of claim 7, wherein the joint clamp substantially surrounds the shovel shaft.

10. The shovel assembly of claim 7, wherein the joint bracket comprises:
    a first bracket including a joint bore that is coaxial with the joint axis and a first bracket bore that is coaxial with the bracket axis;
    a second bracket in contact with the first bracket, the second bracket including a second bracket bore that is coaxial with the bracket axis; and
    a first bushing for contacting the auxiliary handle, the first bushing having a third bracket bore that is coaxial with the bracket axis.

11. The shovel assembly of claim 7, wherein the auxiliary grip is a spade grip including a grip portion that extends substantially perpendicularly to the auxiliary axis.

12. The shovel assembly of claim 7, wherein the shovel grip is a spade grip including a grip portion that extends substantially perpendicularly to the shovel shaft.

13. The shovel assembly of claim 7, wherein the auxiliary shaft is between 50% and 100% of a length of the shovel shaft.

14. The shovel assembly of claim 7, wherein the joint clamp is mountable to a tool shaft of the shovel that extends along a tool shaft axis, the joint clamp having a clamp axis that is substantially parallel to the tool shaft axis when the auxiliary handle is mounted to the tool shaft.

15. The shovel assembly of claim 7, and further comprising:
    a retainer connected to at least one of the auxiliary shaft and the shovel shaft.

16. The shovel assembly of claim 15, wherein the retainer comprises a magnet.

17. A universal joint for connecting an auxiliary handle to a tool, the universal joint comprising:
    a joint bracket that connects the auxiliary handle to the universal joint for rotation about a bracket axis, the joint bracket comprising:
       a first bracket including a joint bore having a joint axis and a first bracket bore coaxial with a bracket axis, wherein the joint axis and the bracket axis are substantially perpendicular;
       a second bracket in contact with the first bracket, the second bracket including a second bracket bore that is substantially coaxial with the bracket axis; and
       a first bushing for contacting the auxiliary handle, the first bushing having a third bracket bore that is coaxial with the bracket axis; and
    a joint clamp that is rotatably connected to the joint bracket to allow rotation about the joint axis, the joint clamp being mechanically connectable to and disconnectable from a tool shaft.

18. The universal joint of claim 17, and wherein the joint clamp further comprises:
    a first clamp portion including a first securing bore and a clamp bolt that extends along the joint axis;

a second clamp portion including a second securing bore that is aligned with the first securing bore; and a first clamp fastener extending through both the first securing bore and the second securing bore;

wherein the joint bracket is rotatably attached to the joint clamp by the clamp bolt that passes through a joint bore in the joint bracket.

19. The universal joint of claim 17, wherein the first bracket is comprised of metal and the second bracket is comprised of polymer.

20. The universal joint of claim 17, and further comprising:

a fourth bracket bore in the first bracket and a fifth bracket bore in the second joint bracket, wherein the fourth and fifth bracket bores are coaxial with the bracket axis.

21. The universal joint of claim 17, and further comprising:

a second bushing having a sixth bracket bore that is coaxial with the bracket axis.

22. An auxiliary handle comprising:

an auxiliary shaft that extends along an auxiliary axis and has a first end and a second end;

a magnet attached to the first end of the auxiliary shaft;

a joint bracket having a bracket axis which is substantially perpendicular to the auxiliary axis, wherein the second end of the auxiliary shaft is rotatably connected to the joint bracket for rotation about the bracket axis; and a joint clamp having a joint axis which is substantially perpendicular to the bracket axis, wherein the joint bracket is rotatably connected to the joint clamp for rotation about the joint axis, and wherein the joint clamp comprises:

a first clamp portion including a first securing bore and a clamp bolt that extends along the joint axis;

a second clamp portion including a second securing bore that is aligned with the first securing bore; and a clamp fastener extending through both the first securing bore and the second securing bore;

wherein the joint bracket is rotatably attached to the joint clamp by the clamp bolt that passes through a joint bore in the joint bracket.

23. The auxiliary handle of claim 22, wherein the joint clamp is mountable to a tool shaft that extends along a tool shaft axis, the joint clamp having a clamp axis that is substantially parallel to the tool shaft axis when the auxiliary handle is mounted to the tool shaft.

24. The auxiliary handle of claim 22, and further comprising:

an auxiliary grip connected to the first end of the auxiliary shaft.

25. The auxiliary handle of claim 24, wherein the auxiliary grip is a spade grip including a grip portion that extends substantially perpendicularly to the auxiliary axis.

* * * * *